United States Patent [19]

Hughes

[11] Patent Number: 5,177,656
[45] Date of Patent: Jan. 5, 1993

[54] FLEXIBLE MAGNETIC DISC CASSETTES WITH INTEGRALLY MOLDED WEAR BUTTON

[75] Inventor: Patrick M. Hughes, Clinton, N.J.

[73] Assignee: Hoechst Celanese Corporation, Somerville, N.J.

[21] Appl. No.: 650,594

[22] Filed: Feb. 5, 1991

[51] Int. Cl.⁵ .................................................. G11B 23/03
[52] U.S. Cl. .................................................. 360/133
[58] Field of Search ............... 360/133, 135, 99.12, 360/99.05

[56] References Cited

U.S. PATENT DOCUMENTS

| | | | |
|---|---|---|---|
| Re. 31,781 | 11/1988 | Takahashi | 360/133 |
| 3,845,502 | 10/1974 | Paus | 360/86 |
| 4,078,246 | 3/1978 | Berthoux et al. | 360/133 |
| 4,436,201 | 3/1984 | Inaba | 206/444 |
| 4,445,155 | 4/1984 | Takahashi | 360/99.05 X |
| 4,481,552 | 11/1984 | Dona et al. | 360/97 |
| 4,517,617 | 5/1985 | Tsuji et al. | 360/133 |
| 4,590,532 | 5/1986 | Saito | 360/133 |
| 4,613,044 | 9/1986 | Saito et al. | 206/444 |
| 4,628,388 | 12/1986 | Kawabe | 360/128 |
| 4,630,156 | 12/1986 | Saito | 360/133 |
| 4,640,949 | 2/1987 | Wagman | 524/227 |
| 4,669,078 | 5/1987 | Ogusu | 369/291 |
| 4,686,666 | 8/1987 | Dieffenbach | 369/290 |
| 4,698,714 | 10/1987 | Sugawara et al. | 360/133 |
| 4,710,913 | 12/1987 | Matsushima et al. | 369/280 |
| 4,796,140 | 1/1989 | Wakabayashi et al. | 360/133 |
| 4,885,653 | 12/1989 | Kato | 360/133 |
| 4,899,244 | 2/1990 | Morse | 360/133 |
| 4,903,224 | 2/1990 | Namiki et al. | 369/290 |
| 4,926,410 | 5/1990 | Suzuki et al. | 369/290 |
| 4,941,066 | 7/1990 | Swinburne et al. | 360/133 |
| 4,944,982 | 7/1990 | Kikuchi | 428/64 |
| 4,945,530 | 7/1990 | Sandell et al. | 369/291 |
| 4,946,930 | 8/1990 | Takasa et al. | 528/230 |

FOREIGN PATENT DOCUMENTS

| | | | |
|---|---|---|---|
| 60-202580 | 10/1985 | Japan | 360/133 |
| 1531088 | 11/1978 | United Kingdom | 360/133 |
| 2161977 | 1/1986 | United Kingdom | 360/133 |

OTHER PUBLICATIONS

IBM/TDB vol. 24, No. 1A, Jun. '81, p. 216, "Flexible Disk Cartridge Arrangement" by Henderson.
IBM/TDB vol. 21, No. 10, Mar. 1979, pp. 4192–4194, "Cartridge . . . for a Magnetic Recording Disk" by Johnson et al.

Primary Examiner—John H. Wolff
Attorney, Agent, or Firm—Nixon & Vanderhye

[57] ABSTRACT

A cassette case for rotatably accommodating a flexible magnetic disc includes joined upper and lower cassette case halves. At least the upper cassette case half (and preferably both cassette halves) is formed of a molded plastics material, preferably an oxymethylene polymer. A wear button which is centrally located with respect to, and projects outwardly from, an interior surface of the upper cassette half, includes an integrally molded wear button. The wear button provides a low friction surface against which a drive spindle of a magnetic recording/reproducing apparatus bears when the cassette case (and its associated flexible magnetic disc) are placed into service. The wear button is most preferably in the form of a smooth convexly arcuate surface so as to minimize the contact area with the drive spindle, which thereby further contributes to its low friction characteristics.

16 Claims, 2 Drawing Sheets

FLEXIBLE MAGNETIC DISC CASSETTES WITH INTEGRALLY MOLDED WEAR BUTTON

FIELD OF INVENTION

The present invention relates generally to cassettes for flexible sheet-like discs of magnetic media. More specifically, the present invention relates to improved cassette constructions for flexible magnetic discs whereby the cassette case includes an integrally molded wear button providing a low friction surface against which the terminal end of a drive spindle associated with a magnetic recording/reproducing apparatus bears when the magnetic disc is placed in service.

BACKGROUND AND SUMMARY OF THE INVENTION

Flexible sheet-like magnetic discs having a nominal standardized size of about 3.5 inches are widely used in a variety of data storage/retrieval systems. For example, cassettes which include flexible magnetic discs are used in conjunction with personal computers so as to load data and/or programs into the central processing unit of the computer, as well as to store data in an off-site location in a more convenient manner.

When placed into service in a magnetic recording/reproducing apparatus, the magnetic disc (which is accommodated for rotational movement within the interior of the cassette case) is caused to spin relative to a magnetic read/write head by means of a motor-driven spindle coacting with an aperture in the central hub of the magnetic disc. The spindle, moreover, serves to center the magnetic disc relative to the magnetic read/write head so that accurate placement and retrieval of data onto and from the disc will ensue.

The cassette case for flexible magnetic discs having a standardized size of about 3.5 inches (i.e., so-called "microdiscs") is relatively thin (i.e., on the order of about 0.14 inch (3.4 mm)). The motor-driven spindle thus enters the cassette case through an opening defined in the lower cassette half and then extends through the aperture in central hub of the magnetic disc such that its terminal end contacts an interior surface portion of the upper cassette half. Contact between the terminal end of the motor-driven spindle and the interior surface portion of the upper cassette half sometimes also causes the cassette case to bow or flex in its central region so as to create more clearance space between the case and the magnetic disc and thereby facilitate spinning of the latter relative to the former.

Conventional cassette cases are usually formed of a plastics material (e.g., acrylonitrile-butadiene-styrene (ABS) terpolymer) which has the necessary mechanical properties needed to protect the magnetic disc. However, cassette cases formed of such plastics materials do not have the necessary anti-friction (i.e., low coefficient of friction against steel) properties needed to serve as a bearing surface for the motor-driven spindle during use. As a result, conventional flexible magnetic disc cassette cases include a separate wear button formed of a different plastics material (e.g., a blend of high density polyethylene and a minor amount (e.g., between 10–20 wt. %, and typically around 2 wt. %) of polytetrafluoroethylene) having a lower coefficient of friction against steel as compared to the plastics material from which the cassette case is formed.

The separate wear button associated with conventional flexible magnetic disc cassettes is typically fixed to the interior portion of the upper cassette half via adhesive bonding or like techniques. As a result, there is necessarily increased handling requirements (increased labor) needed to produce conventional flexible magnetic disc cassettes. Therefore, although the provision of a separate wear button with conventional flexible magnetic disc cassettes does provide a relatively low friction surface against which the motor-driven spindle bears when the flexible magnetic disc cassette is placed into service, the manufacturing costs are necessarily increased due to increased labor/handling which ensues during production. It is towards reducing (or eliminating entirely) these added costs associated with separate wear buttons that the present invention is directed.

According to the present invention, at least the upper half of the cassette case is formed entirely of a moldable plastics material which not only meets the mechanical properties demanded for flexible cassette cases generally, but also exhibits the necessary anti-friction properties needed in order to provide a low friction surface against which the motor-driven spindle associated with a magnetic recording/reproducing apparatus can bear during use. As a result, a wear button may be provided as an integrally molded (one-piece) structure associated with the upper half of the cassette case on its interior surface in opposition to the motor-driven spindle.

The plastics material from which at least the upper half of the cassette case (and more preferably both the upper and lower halves of the cassette case) is formed according to the present invention is an oxymethylene polymer which exhibits the necessary mechanical properties (e.g., tensile, compressive, and flexural strengths) and anti-frictional property against steel. Most preferably, the integrally molded wear button according to the present invention will present a smooth convexly arcuate surface (which most prefereably is a spherical surface segment) to the terminal end of the motor-driven spindle so as to minimize the contact area therebetween, and thus further reduce frictional wear when in use.

Further aspects and advantages of the present invention will become more clear after careful consideration is given to the following detailed discussion thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 3:
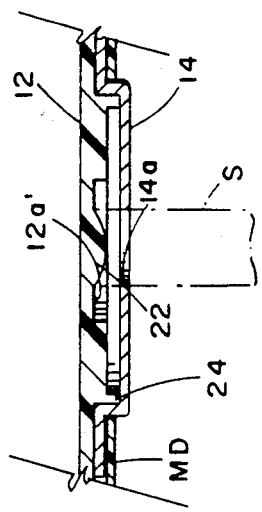
FIG. 3 is a partial cross-sectional view of the upper half of the cassette case according to this invention as taken along line 3—3 in FIG. 2.
Figure 1:
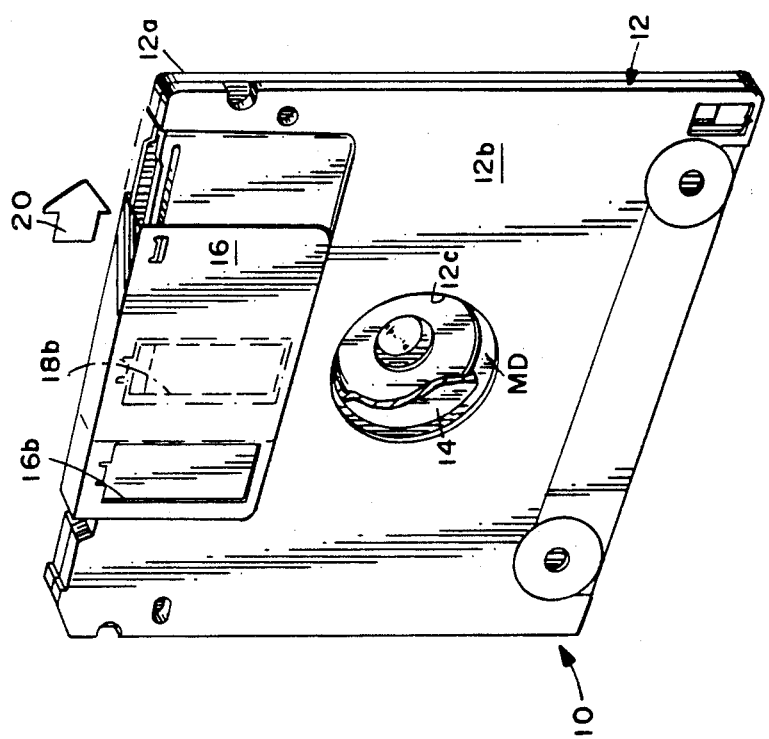
FIG. 1 is a perspective view of a flexible magnetic disc cassette according to the present invention.

Accompanying FIG. 1 shows a preferred embodiment of a flexible magnetic disc cassette 10 according to the present invention. The cassette 10 shown in FIG. 1 is, moreover, configured according to accepted industry standards for nominal 3.5-inch discs. In this regard, the cassette 10 includes a cassette case 12 having upper and lower cassette case halves 12a, 12b, respectively, joined to one another along their peripheral edges, for example. The lower cassette case half 12b defines an enlarged opening 12c which accommodates a drive carriage (not shown) associated with a conventional magnetic recording/reproducing apparatus. The drive carriage will also include a centrally located spindle S (not shown in FIG. 1 but shown in phantom line in FIG. 3) which coacts with the drive aperture 14a associated with the central hub 14 of the magnetic disc MD (see FIG. 2).

The cassette case 12 will also have a movable shutter 16 which is biased via a spring element (not shown) in a direction whereby the shutter 16 is in a position which closes each of the access windows 18a and 18b defined in the upper and lower case halves 12a and 12b, respectively. The shutter 16 itself defines openings 16a, 16b, which may be brought into registry with the windows 18a, 18b, when the shutter 16 is moved into its opened position (arrow 20 in FIG. 1) against the bias force of the spring element (not shown). Movement of the shutter 16 into its opened position typically happens automatically when the cassette 10 is inserted into the input slot of a magnetic recording/reproducing apparatus. The magnetic read/write head of such recording/reproducing apparatus may thus be brought into operative association with the magnetic disc MD by virtue of the registry of the openings 16a, 16b with the windows 18a, 18b, respectively.

Important to the present invention, the upper cassette case half 12a also includes an integrally molded wear button 22 which projects outwardly from the interior surface 12a'. Because the wear button 22 is integrally molded with the upper cassette case half 12a, it forms a one-piece structure with the upper cassette case half 12a, and is therefore formed of the same plastics material as the upper cassette case half 12a. The wear button 22 is integrally molded with the upper cassette case half 12a so as to be centrally located relative to the hub 14 of the magnetic disc MD and thereby be in opposition with the drive opening 14a formed therein. Hence, the wear button is also in opposition to the spindle S associated with the magnetic recording/reproducing apparatus when the cassette 10 is placed in service. As a result, the terminal (free) end of the motor-driven spindle S will contact the wear button 22 (as shown more clearly in accompanying FIG. 3) during use.

The wear button 22 is most preferably a smooth convexly arcuate (spherical) surface. Thus, that area of the wear button's surface which actually contacts the spindle S during use is minimized thereby contributing further to friction reduction as between the spindle and the wear button.

Figure 2:
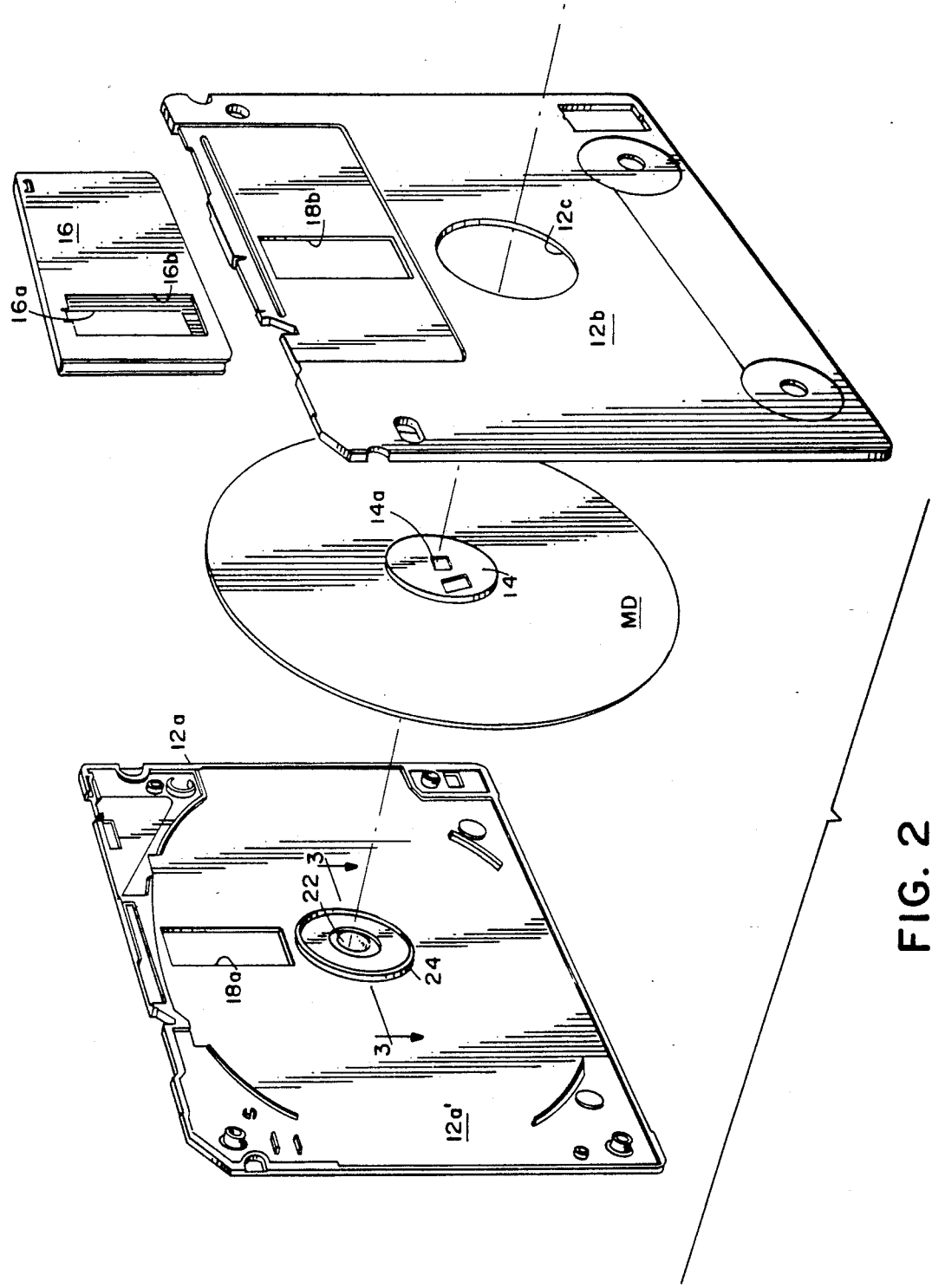
FIG. 2 is an exploded perspective view of the flexible magnetic disc cassette shown in FIG. 1.

The interior surface 12a' of the upper cassette case half 12a (see FIG. 2) is most preferably provided with a magnetic disc centering ring 24 protruding from the interior surface 12a' of the upper cassette case half 12a in annular relationship to the wear button 22 as shown in accompanying FIG. 2. The centering ring 24 serves as a guide for the central hub 14 of the magnetic disc MD during use, and also prevents lateral slippage of the magnetic disc MD (which could damage the same) during periods of nonuse.

As briefly mentioned above, the wear button 22 is formed as an integrally molded (one-piece) structure with the upper cassette case half 12a. The plastics material from which the upper cassette case half 12a, and hence the wear button 22, is made must therefore universally satisfy the mechanical strength properties required of the former as well as the anti-friction properties required of the latter. Most preferably, the upper cassette case will have the required mechanical strength properties that are at least comparable to plastics material from which cassette cases are conventionally made (e.g., ABS resins), but will exhibit significantly better anti-friction properties against steel.

The plastics material from which at least the upper cassette case is formed will exhibit a wear factor versus steel of at least about 65 (ASTM D1894), a static coefficient of friction versus steel (40 psi) of at least about 0.14 (ASTM D1894), and a dynamic coefficient of friction versus steel (40 psi, 50 fpm) of at least about 0.21.

The preferred plastics material employed to form at least the upper cassette half 12a (and preferably also the lower cassette half 12b) with an integrally molded wear button 22 is an oxymethylene polymer having repeating oxymethylene ($-CH_2O-$) units. The oxymethylene polymers that may be satisfactorily employed according to the present invention can be either homopolymers (i.e., comprised solely of recurring oxymethylene units, exclusive of endcapping units), or copolymers (i.e., comprised mainly of recurring oxymethylene units randomly interspersed with higher oxyalkylene (preferably oxyethylene) units, exclusive of endcapping units). The preferred oxymethylene homopolymers may be made using the techniques disclosed in U.S. Pat. No. 2,768,994 to MacDonald, whereas the preferred oxymethylene copolymers may be made using the techniques disclosed in U.S. Pat. No. 3,027,352 to Walling (the entire content of each being expressly incorporated hereinto by reference).

Oxymethylene copolymers comprised mainly of recurring oxymethylene units interspersed with oxyethylene units are especially preferred. The most preferred oxymethylene copolymers are Celcon ® oxymethylene copolymers commercially available from Hoechst Celanese Corporation, Engineering Plastics Division, Short Hills, N.J. Most preferred is Celcon ® Grade MM3.5C polyoxymethylene copolymer.

If desired, the oxymethylene polymers employed to form at least the upper cassette case may include additives typically employed in engineering resin compositions. Some of the additives that may be incorporated into oxymethylene polymers include antioxidants, UV stabilizers, free radical scavengers, lubricants, fillers, reinforcing media (e.g., glass fibers), colorants, and the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A molded cassette case for a flexible magnetic disc, comprising:
 upper and lower cassette case halves joined to one another to define an interior space;
 a flexible magnetic disc accommodated for rotational movement within said interior space of said joined upper and lower cassette halves,
 said lower cassette case half defining an opening sized and configured to accept a drive carriage associated with a magnetic recording/reproducing apparatus, which drive carriage includes a motor-driven spindle which projects towards an interior surface of said upper cassette case half;

said upper cassette case half including (i) an integrally molded centering ring which prevents lateral slippage of said magnetic disc within said interior space, and (ii) an integrally molded wear button centrally located with respect to said centering ring and projecting from said interior surface of said upper cassette case half toward said magnetic disc, said wear button providing a surface against which said spindle bears.

2. A cassette case as in claim 1, wherein said wear button is in the form of a smooth convexly arcuate surface.

3. A cassette case as in claim 1, wherein said upper cassette case half and said wear button are integrally molded with one another from an oxymethylene polymer.

4. A cassette case as in claim 3, wherein said lower cassette case half is molded from an oxymethylene polymer.

5. A cassette case as in claim 3, wherein said oxymethylene polymer is an oxymethylene copolymer comprised mainly of repeating oxymethylene units randomly interspersed with higher oxyalkylene units.

6. A cassette case as in claim 5, wherein said higher oxyalkylene units are oxyethylene units.

7. A cassette case which accommodates a flexible magnetic disc for rotational movement comprising upper and lower cassette case halves, wherein said upper cassette case half is formed of a molded plastics material and includes (i) an centering ring which prevents lateral slippage of said magnetic disc within said cassette case, and (ii) a wear button integrally molded with said upper cassette case half, said wear button being centrally located with respect to said centering ring and projecting from an interior surface of said upper cassette case half toward said magnetic disc, said wear button providing low friction means against which a drive spindle for rotating said flexible magnetic disc bears.

8. A cassette case as in claim 7, wherein said wear button is in the form of a smooth convexly arcuate surface.

9. A cassette case as in claim 7, wherein at least said upper cassette case half is formed of a plastics material which exhibits a wear factor versus steel of at least about 65.

10. A cassette case as in claim 7, wherein at least said upper cassette case half is molded from an oxymethylene polymer.

11. A flexible magnetic disc cassette having a cassette case formed of a molded plastics material and a flexible magnetic disc accommodated within said cassette case for rotational movement, said cassette adapted to being operated within a magnetic recording/reproducing apparatus of the type having a motor-driven spindle which coacts with the magnetic disc to rotate the same within the cassette case, wherein said cassette case includes (i) a centering ring which prevents lateral slippage of said magnetic disc within said cassette case, and (ii) a wear button disposed centrally with respect to said centering ring and being integrally molded of the same plastics material as said cassette case, said wear button being in opposition to the motor-driven spindle to provide a surface against which said spindle bears during rotation of said flexible magnetic disc.

12. A cassette as in claim 11, wherein said wear button is in the form of a smooth convexly arcuate surface.

13. A cassette as in claim 11, wherein at least said upper cassette case half is formed of a plastics material which exhibits a wear factor versus steel of at least about 65.

14. A cassette as in claim 11, wherein said plastics material from which said cassette case is molded is an oxymethylene polymer.

15. A cassette case as in claim 14, wherein said oxymethylene polymer is an oxymethylene copolymer comprised mainly of repeating oxymethylene units randomly interspersed with higher oxyalkylene units.

16. A cassette case as in claim 15, wherein said higher oxyalkylene units are oxyethylene units.

* * * * *

UNITED STATES PATENT AND TRADEMARK OFFICE
CERTIFICATE OF CORRECTION

PATENT NO. : 5,177,656

DATED : January 5, 1993

INVENTOR(S) : Patrick M. HUGHES

It is certified that error appears in the above-identified patent and that said Letters Patent is hereby corrected as shown below:

```
Column 1, line 42, after "in" insert --the--;
         line 43, after "contacts" insert --with--.
```

Signed and Sealed this

Thirtieth Day of November, 1993

Attest:

BRUCE LEHMAN

*Attesting Officer*

*Commissioner of Patents and Trademarks*